Figure 1:
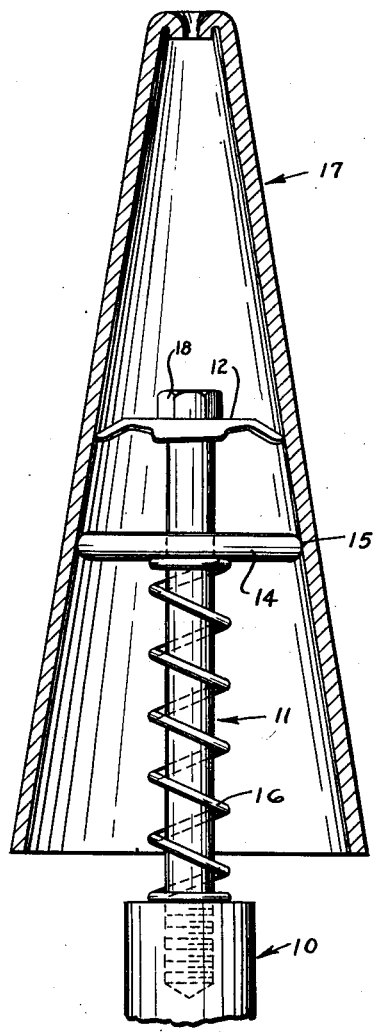

Nov. 7, 1950     R. B. PUTNAM     2,529,351
CONE HOLDER
Filed Dec. 10, 1947

INVENTOR.
ROBERT B. PUTNAM
BY
Kimmel & Crowell
ATTYS.

Patented Nov. 7, 1950

2,529,351

UNITED STATES PATENT OFFICE 2,529,351

CONE HOLDER

Robert B. Putnam, Cobleskill, N. Y., assignor to Fenimore Fabrics, Incorporated, Cobleskill, N. Y.

Application December 10, 1947, Serial No. 790,850

1 Claim. (Cl. 242—130)

This invention relates to cone holders for use on knitting or other textile machines.

In knitting or other textile machines, where the yarn or thread is wound on cones, the latter will vary in length, degree of taper and diameter, with the result that the machines have to be adapted to the particular cone. It is, therefore, an object of this invention to provide a cone holder which will automatically adapt itself to various kinds and types of cones.

Another object of this invention is to provide a cone holder of this type which can be mounted on the present structure of creel frames.

A further object of this invention is to provide a cone holder which is of simple construction and will firmly hold a cone in operative position so that the cone can be easily and quickly applied or removed from the holder.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

Figure 2:
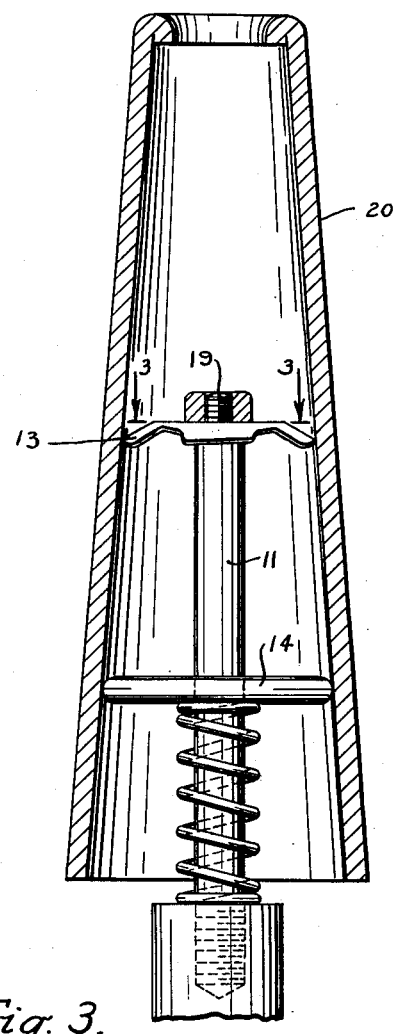
Figure 3:
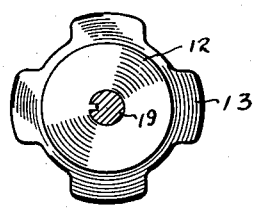
Figure 4:
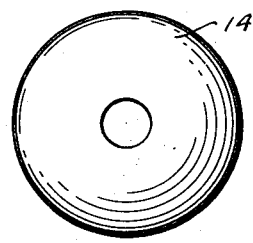

In the drawing,

Figure 1 is a detailed side elevation of a cone holder constructed according to an embodiment of this invention, for mounting on the creel frame of a textile warping machine, showing a cone in vertical section mounted thereon, Figure 2 is a view similar to Figure 1, showing a different form of cone mounted on this holder, Figure 3 is a sectional view taken on the line 3—3 of Figure 2, Figure 4 is a plan view of the sliding or floating washer used with this device.

Referring to the drawing, the numeral 10 designates generally a portion of a creel frame for a knitting machine which has secured thereto a bolt 11. The bolt 11, which may be either vertically or horizontally disposed, has mounted on the upper end thereof a washer 12 which is formed with downwardly flared inclined cone engaging fingers 13, which produce a threading means so that the cone will be locked by such fingers upon partial clockwise turning of the cone. The bolt 11 has slidably thereon below the washer 12 a second washer 14 which, as shown herein is formed with a rounded marginal edge 15. The lower washer 14 is a sliding or floating washer and is constantly urged upwardly by means of a spring 16 which engages about the bolt 11 and bears at its lower end against the supporting portion of the creel frame with which the bolt 11 is engaged. The upper end of the spring 16 bears against the lower side of the sliding or floating washer 14. Preferably the spring 16 is a relatively weak spring so that when a cone 17, as shown in Figure 1, is disposed in telescoping position over the washers 12 and 14, the lower or sliding washer 14 will move downwardly and automatically adapt itself to the taper of the cone 17 so that the lower washer 14 will engage the inside surface of the cone 17 at a point below the upper washer 12. The upper washer 12 is secured to the upper end of the bolt 11 by means of a nut 18 which is threaded on a reduced stud 19 carried by the upper end of the bolt 11.

As shown in Figure 2, the cone holder can easily and quickly adapt itself to different types of cones or cones having different tapers. The cone 20 shown in Figure 2, has a more shallow taper than the cone 17 shown in Figure 1, and in adapting itself to the cone 20 the floating or sliding washer 14 will be moved downwardly a greater distance until this washer 14 firmly contacts the inside surface of the cone 20 and coacts with the downwardly flared fingers of the washer 12 in providing spaced supporting surfaces for the cone. The washer 14 is substantially larger in diameter than the diameter of the washer 12 including the fingers 13 and is of such diameter with respect to the washer 12 that substantially all types of cones conventionally used with textile warping operations will be engaged by and supported in operative position by this holder.

In mounting the cone 17 on the holder, the cone is extended over the washer 12 and the fingers 13 until the fingers 13 contact the inside surface of the cone. At this time the lower washer 14 is moved downwardly against the tension of spring 16. The cone 17 is then given a partial clockwise turn so that the fingers 13 will bite into the cone in a threading action and thereby lock the cone on the device. The cone is removed by counterclockwise turning thereof, followed by endwise movement.

I do not mean to confine myself to the exact details of construction herein disclosed, but claim all variations falling within the purview of the appended claim.

What I claim is:

A cone holder for knitting or textile machines comprising a bolt adapted for mounting on a creel frame, an upper washer fixed on said bolt and formed with a plurality of radially disposed downwardly inclined cone gripping fingers having substantial width, the outer edges of said fingers being obliquely inclined with respect to the axis of the washer whereby to constitute fragmentary threads for biting threaded engagement with the inside of the cone at a point spaced from the small end of the latter, a second washer slidable on said bolt below said first washer, the rim of said second washer being round in transverse section, and a spring about said bolt constantly urging said second washer upwardly, said second washer being larger in diameter than said first washer and frictionally engageable with the inside of the cone at a point spaced downwardly from said first washer.

ROBERT B. PUTNAM.

REFERENCES CITED

The following references are of record in the file of this patent:

UNITED STATES PATENTS

| Number | Name | Date |
| --- | --- | --- |
| 515,301 | McCausland | Feb. 20, 1894 |
| 702,076 | Riley | June 10, 1902 |
| 1,212,600 | Altemus | Jan. 16, 1917 |
| 1,533,913 | Heymann | Apr. 14, 1925 |
| 1,635,525 | Anderson | July 12, 1927 |
| 1,904,737 | Javery | Apr. 18, 1933 |
| 1,916,862 | Kershaw | July 4, 1933 |